F. L. WEBSTER.
MACHINE FOR WASHING AND POLISHING FRUIT AND VEGETABLES.
APPLICATION FILED OCT. 19, 1921.
1,407,501.
Patented Feb. 21, 1922.
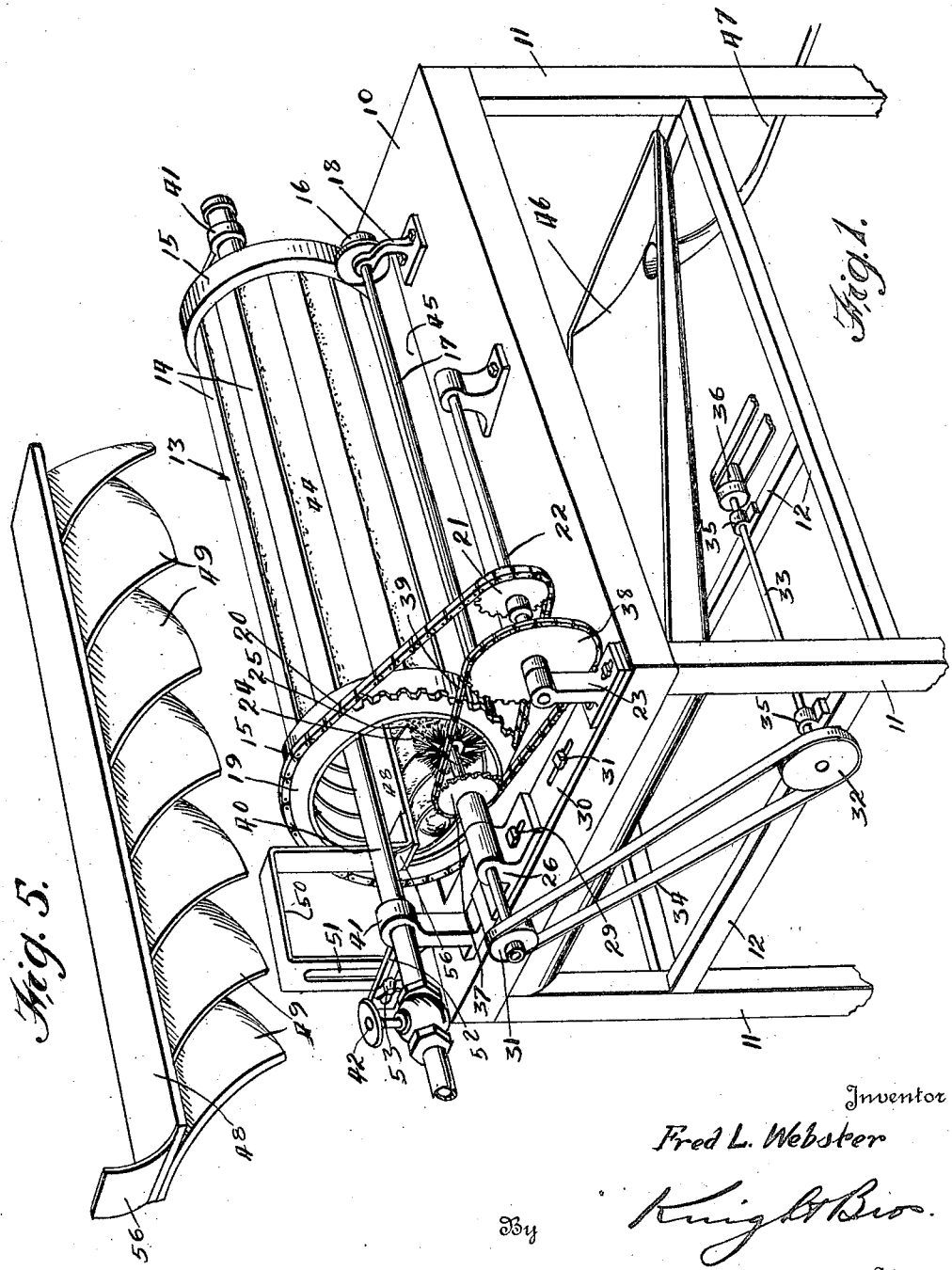

F. L. WEBSTER.
MACHINE FOR WASHING AND POLISHING FRUIT AND VEGETABLES.
APPLICATION FILED OCT. 19, 1921.
1,407,501.
Patented Feb. 21, 1922.
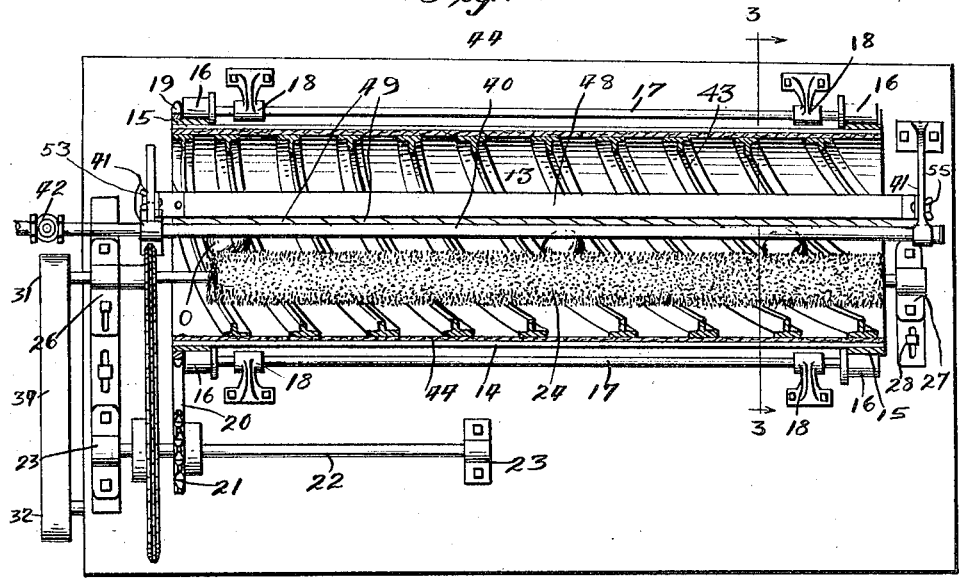
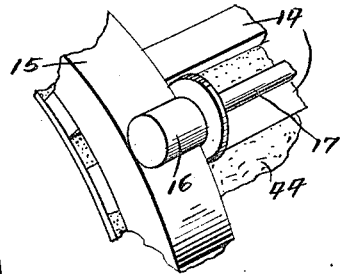
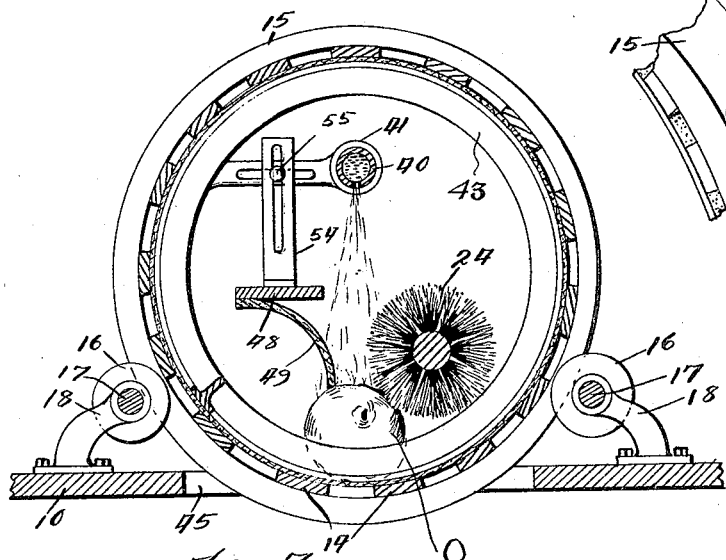
Inventor
Fred L. Webster
By Knight Bros.
Attorneys

UNITED STATES PATENT OFFICE.

FRED L. WEBSTER, OF ADAMS, NEW YORK.

MACHINE FOR WASHING AND POLISHING FRUIT AND VEGETABLES.

1,407,501.  Specification of Letters Patent.  Patented Feb. 21, 1922.

Application filed October 19, 1921. Serial No. 508,767.

*To all whom it may concern:*

Be it known that I, FRED L. WEBSTER, a citizen of the United States, and a resident of Adams, in the county of Jefferson and State of New York, have invented certain new and useful Improvements in a Machine for Washing and Polishing Fruit and Vegetables, of which the following is a specification.

My invention relates to an improvement in a fruit and vegetable washer and polisher and relates particularly to a device of this character in which the fruit or vegetable to be cleaned is subjected to a brushing and cleaning action of uniform pressure while it is moved progressively through the machine.

One of the advantages of my invention is that it is applicable with equal efficiency to any type of fruit or vegetable and furthermore, that the arrangement of the parts is such that the article passing through the machine is not liable to become bruised or injured.

Another advantage of my machine is that floor space may be economized, the construction of the machine making possible a greater operating capacity than has heretofore been possible.

The various advantages and features of my invention will be made more apparent in the accompanying specification and drawings in which:

Fig. 1 is a perspective view of the machine,

Fig. 2 is a horizontal section,

Fig. 3 is a section on line 3—3 of Fig. 2,

Fig. 4 is a fragmentary detail view; and

Fig. 5 is a detail perspective view.

By reference to the drawings it will be seen that the machine comprises a base 10 mounted upon a supporting frame comprising legs 11 and struts or braces 12.

The washing or cleaning chamber is in the form of an elongated cylinder 13 formed of a plurality of longitudinally disposed spaced slats 14 which may be made of wood or any other suitable material, together with a pair of hoops or bands 15 disposed at either end of the cylinder and to which the slats 14 are secured in any suitable manner.

The washing chamber is revolubly mounted upon the support 10 by means of flanged rollers 16 mounted upon longitudinal shafts 17 which are in turn journaled in suitable bearings 18. As will be apparent from an examination of Figs. 1 and 3, there are provided two pairs of rollers 16, a pair of rollers supporting each end of the chamber 13, the flanges thereof riding against the inner sides of the hoops or bands 15, thereby preventing a longitudinal displacement of the washing chamber.

Rigidly secured to one end of the washing chamber 13 is a sprocket wheel 19 with which engages a sprocket chain 20, for the purpose of revolving the washing chamber. The sprocket chain 20 is driven by a sprocket wheel 21 mounted to rotate with a counter shaft 22, journaled in bearings formed on brackets 23.

Disposed within the washing chamber 13 and longitudinally thereof is a rotatable brush or cleaning member 24. This brush is fixed to a shaft 25 for rotation therewith, which shaft is journaled in bearings carried by suitable brackets 26 and 27. The bracket 27 is adjustably secured to the base 10 by means of a slot and bolt connection 28. The bracket 26 is secured by a slot and bolt connection 29 to a slideable supporting member 30 which in turn is adjustably secured to the base 10 by a slot and bolt connection 31. One of the brackets 23 is also carried by this sliding supporting member 30 as will be apparent from an examination of Figs. 1 and 2.

The shaft 25 extends through its bearing in the bracket 26 and carries on its free end a pulley 31. A second pulley 32 mounted upon a driving shaft 33 is operatively connected to the pulley 31 by a belt 34. The driving shaft 33 is mounted in suitable bearings 35 supported by the struts 12 of the frame of the machine. A pulley and belt gearing 36 which may be connected to any suitable source of power serves to supply power to the driving shaft 33.

A pair of sprocket wheels 37 and 38 secured to shafts 25 and 22 respectively are connected by a sprocket chain 39. By this means the counter shaft 22 is rotated and through the sprocket chain gear 19, 20, 21, the washing chamber 13 is revolved.

Extending through the washing chambers 13 and longitudinally thereof is a water supply pipe 40 supported by suitable brackets 41 disposed at either end of the supporting table 10. A valve 42 controls the admission of water thereto and the pipe 40 is suitably perforated to cause the water therein to be sprayed upon the contents of the washing chamber.

The interior of the washing chamber 13 is provided with a spirally arranged rib or guiding member 43 which begins at one end of the chamber 13 and extends throughout its length to the other end thereof. This spiral is for the purpose of advancing the contents of the washing chamber during its rotation from its receiving to its discharge end. Obviously, the capacity of the machine may be increased by multiplying the spiral or by varying the pitch of the single spirals. The inner face of the washing chamber 13 is lined with felt or other suitable friction material 44, for the purpose of engaging the fruit or vegetables passing therethrough to assist in cleaning and scouring the same.

Adjustably suspended within the washing chamber 13 is a polishing element 48 in the form of an elongated bar. Attached to this bar is a plurality of felt pieces or fingers 49. These pieces of felt are attached to the bar 48 so that their free ends depend to a position where they lightly engage the fruit or vegetables passing through the machine as clearly illustrated in Fig. 3. For adjustably suspending this polishing element within the chamber, I provide at one end thereof a substantially inverted U-shaped bracket 50 formed with an elongated slot 51 and to the bracket 41 I secure a cooperating arm 52 likewise slotted. A thumb-screw 53 passing through the slots in the bracket 50 and arm 52 provide for a vertical and lateral adjustment of this end of the polishing element. Similar adjustment of the other end of the polishing element is accomplished by a slotted arm 54 secured to the polishing element and by slotting the bracket 41 which supports the water pipe 40. In this instance also a thumb-screw 55 adjustably secures the arm 54 to the bracket 41. Projecting upwardly from the end of the polishing member disposed at the inlet end of the washing chamber there is provided a lip 56 which the fruit or vegetables will engage so that only one article to be cleaned will enter the spiral groove at one time.

The support or table 10 is cut away as at 45 to permit the waste water from the washing chamber 13 to pass therethrough. An inclined trough 46 is supported beneath the table 10 in a position to catch this waste water, which may be conducted away by a discharge pipe 47.

In using my improved machine the fruit is placed in the washing chamber 13 at the receiving end thereof and in Fig. 2 a piece of fruit such as an orange O is shown in dotted lines. As the fruit or vegetables to be cleaned is fed into the receiving end of the washing chamber, this chamber is revolved Simultaneously the brush or cleaning member 24 is revolved. By opening the valve 42 water is sprayed from the pipe 40 which, with the aid of the brush or cleaning member 24 and the felt 44, provided on the interior of the washing chamber, gives the fruit or vegetables a thorough washing and scouring. The felt fingers of the polishing element will also lightly engage the fruit or vegetables passing through the machine and assist in polishing the same. The spiral 43 being in rotation with the washing chamber causes the fruit to be advanced through the washing chamber until it reaches the other end thereof where it will be discharged. During the passage of the fruit through the chamber 13 it is caused to constantly contact the brush 24 and the felt 44. Thus as the fruit or vegetables leave the discharge end of the chamber 13 they are thoroughly washed and all dirt and foreign matter removed therefrom.

The water used during the washing of the fruit or vegetables escapes through the lower side of the chamber 13 and is caught in the drain trough 46 and thereafter conveyed away.

It should be noted that by providing the two sets of flanged rollers 16 for supporting the washing chamber I am enabled to leave the ends thereof open and free from bearings or supports thereby enabling the fruit and vegetables to be easily fed to the machine and discharged therefrom. As hereinbefore mentioned the flanges of the rollers 16 by engagement with the end face of the hoops or bands 15 prevent a longitudinal displacement of the washing chamber.

The adjustment provided for the several supporting brackets permit the sprocket chains to be tightened and also permit the brush or cleaning member 24 to be adjustably positioned within a small latitude within the washing chamber.

The arrangement of the several parts of my machine are of such a simple construction that they may be cheaply and easily manufactured and the liability of their becoming broken and inoperative materially reduced.

While the structure herein illustrated and described has proven to be an efficient one, I do not wish to be unnecessarily limited to this disclosure but reserve the right to make such variations and modifications in the structural details as may come within the purview of the accompanying claims.

Having thus described my invention, what I claim is:

1. A device of the class described comprising a base, a washing chamber revolubly mounted thereon, a cleaning member revolubly mounted and disposed within said chamber, means for rotating said chamber and cleaning member, a polishing member suspended within said chamber, and a spiral arranged within said chamber.

2. A fruit and vegetable washer comprising a base, a washing chamber revolubly supported on said base, a cleaning brush disposed within said chamber, a polishing member, means for rotating said chamber and said brush, a spirally arranged rib extending the length of said chamber, said chamber being open at both ends whereby the fruit or vegetables to be cleaned may be fed into one end of said cleaning chamber and discharged at the other end thereof.

3. In a fruit and vegetable cleaning machine of the class described a supporting table, an elongated cylindrical cleaning chamber revolubly mounted upon said supporting table, a cleaning brush disposed within said chamber, power operated means operatively connected to said chamber and brush for revolving the same, a polishing element disposed within said chamber and adjacent said brush, a spirally arranged rib disposed within said chamber and extending from one end to the other thereof for progressively feeding the fruit and vegetables therethrough when said chamber is revolved and a water spray pipe for furnishing water to the contents of said chamber.

4. A fruit and vegetable washing device of the class described comprising a supporting table, an elongated cylindrical washing chamber revolubly mounted upon said supporting table, a rotary cleaning brush disposed within said cleaning chamber, power operated means for revolving said chamber and said cleaning member, said chamber being open at both ends thereof, spiral means disposed within said chamber for progressively feeding the fruit and vegetables therethrough when said chamber is revolved, a polishing member adjustably suspended within said chamber, means for spraying water into the interior of said chamber and a drain trough disposed under said chamber for conveying away the waste water.

5. In a cleaning and washing device of the class described a supporting table, an elongated washing chamber formed of slats, a felt covering for the interior of said chamber, means for revolubly supporting said chamber upon said table, means within said chamber for progressviely conveying the fruit and vegetables to be cleaned from one end thereof to the other, a revoluble cleaning brush disposed within said chamber, power operated means for revolving said chamber and cleaning brush, a polishing member provided with a plurality of pieces of felt suspended within said chamber, means for spraying water on to the contents of said chamber and a drain trough disposed under said supporting table for conveying said water away.

6. A fruit and vegetable washing device of the class described comprising a supporting table, an elongated washing chamber provided with imperforate walls, bands arranged at each end of said chamber, flanged bearing rollers mounted upon said table and engaging said bands for revolubly supporting said chamber upon said table, means within said chamber for progressively feeding the fruit and vegetables to be cleaned therethrough, a covering of felt secured to the interior of said chamber, a revoluble cleaning brush disposed in said chamber and adjacent one side thereof, a polishing member, means for revolving said chamber and said cleaning brush and means for spraying water on the contents of said chamber.

7. A cleaning device for fruits and vegetables comprising a supporting table, an open ended elongated cleaning chamber revolubly mounted upon said table, said chamber having imperforate walls and being lined on its interior face with a cleaning felt, means for progressively conveying the fruit and vegetables to be cleaned from one end of said cylinder to the discharge end thereof, a rotary cleaning brush disposed within said chamber, means for adjustably mounting said cleaning brush, a source of power, sprocket wheel and chain connections between said source of power and said chamber and brush for revolving the same, means for adjusting the bearings of said sprocket wheels, a polishing member adjustably suspended within said chamber and so disposed that only a single article can enter said conveying means at one time, an apertured water pipe disposed within said chamber for spraying water to the contents thereof and a drain trough disposed under said table for conveying away the waste water.

FRED L. WEBSTER.